United States Patent [19]
Williams

[11] Patent Number: 5,102,161
[45] Date of Patent: Apr. 7, 1992

[54] SEMI-ACTIVE SUSPENSION SYSTEM WITH ENERGY SAVING VALVE

[75] Inventor: Daniel E. Williams, Stuart, Fla.

[73] Assignee: TRW Inc., Lyndhurst, Ohio

[21] Appl. No.: 666,042

[22] Filed: Mar. 7, 1991

[51] Int. Cl.$^5$ ............................ B60G 11/26; B60G 11/30
[52] U.S. Cl. ...................................... 280/707; 280/714; 280/709; 137/625.62; 60/415
[58] Field of Search ............... 280/702, 709, 714, 707, 280/690, 693, 698; 137/625.62; 60/413, 415

[56] References Cited

U.S. PATENT DOCUMENTS

| | | | |
|---|---|---|---|
| 3,612,103 | 10/1971 | Waddington | 137/625.63 |
| 3,778,081 | 12/1973 | Takahashi et al. | 280/112.2 |
| 3,874,405 | 4/1975 | Thayer | 137/596.16 |
| 3,917,295 | 11/1975 | Hiruma | 280/709 |
| 4,070,035 | 1/1978 | Pelouch | 280/709 |
| 4,251,762 | 2/1981 | Williams | 318/653 |
| 4,840,111 | 6/1989 | Garnjost | 91/436 |
| 4,850,461 | 7/1989 | Rubel | 188/319 |

FOREIGN PATENT DOCUMENTS

2209505 5/1989 United Kingdom ............... 280/707

Primary Examiner—Charles A. Marmor
Assistant Examiner—Tamara L. Finlay
Attorney, Agent, or Firm—Tarolli, Sundheim & Covell

[57] ABSTRACT

A suspension system for a vehicle comprises at least one adjustable wheel corner, each adjustable corner including a linear actuator operatively connected between a sprung mass and an unsprung mass of the vehicle. The linear actuator is actively movable in at least one direction in response to applied fluid pressure. The system further includes a first electrically controlled servo valve having a quiescent pilot fluid flow. An accumulator is connected to its associated actuator through a second electrically controlled servo valve also having a quiescent pilot fluid flow. The quiescent pilot flows from the first and second servo valves are connected to the accumulator for pressurizing the accumulator. A pump is operatively connected to the servo valve for providing pilot pressure, the pump being connectable to the actuator upon operation of the first servo valve. A sensor is provided for sensing force inputs to the vehicle. A controller is connected to the first and second servo valves, and to the sensor for controlling the first and second servo valves in response to sensed force inputs so as to apply fluid pressure to the actuator from at least one of the pump or from the accumulator and thereby alter an effect of the force input to the vehicle.

11 Claims, 4 Drawing Sheets

SEMI-ACTIVE SUSPENSION SYSTEM WITH ENERGY SAVING VALVE

TECHNICAL FIELD

The present invention is directed to an apparatus for controlling relative motion between an unsprung mass and a sprung mass of a vehicle and is particularly directed to a semi-active suspension system having an energy saving valve.

BACKGROUND ART

Vehicle suspension systems are well known in the art. Such suspension systems have as their goal the control of the relative motion between the sprung (chassis) mass and unsprung (associated tire) mass of the vehicle. Suspension systems are classified as either passive, semiactive, or active.

Passive suspension systems dissipate energy produced when a vehicle is driven over an irregular road surface. Such systems provide good vibration isolation. A linear response of a passive suspension system can be altered by (i) adding an advantageous nonlinear attribute, such as direction dependant damping, and (ii) minimizing an objectionable effect, such as stiction. Passive systems, however, react only to applied forces from below through the road surface and from above through inertia of the sprung mass or vehicle body. Ideally, a suspension system should appear "soft" in reacting to road noise inputs and stiff when reacting to inertia inputs. Since a passive system cannot distinguish between the two, an engineering compromise is made.

An active suspension system uses power from the vehicle engine to actively move the vehicle wheels over an irregular road surface. Rather than a shock absorber, as is found in passive suspension system, an active suspension system uses a hydraulic servo-actuator, i.e., a hydraulic motor, to move the vehicle wheel. A plurality of sensors are located at various vehicle locations. A controller, e.g., a microcomputer, monitors the sensor outputs and controls operation of the hydraulic actuator through an electrically controlled servo valve. Through a control algorithm, the controller controls reaction to road noise and inertia inputs and controls relative motion of the sprung and unsprung masses.

In an active suspension system, the servo valve and controller function as an energy control device. The servo valve connects the energy source, i.e., a pump, to the energy consumer, i.e., an actuator. The difference between power in and power out is converted to heat energy by the servo valve.

In a fully active suspension system, the actuator is operated so as to move the wheel up and down relative to the vehicle body as necessary to provide a desired "ride feel" and "handling characteristic" of the vehicle. The hydraulic pump provides energy in terms of fluid flow at system pressure. The servo valve removes energy at a rate to provide fluid flow and pressure so as to move the wheel at a velocity needed to achieve the desired ride feel and handling characteristics. Control of fluid flow controls actuator velocity. Control of fluid pressure controls actuator force.

In a typical fully active suspension system, each corner i.e., each wheel, of the vehicle has an associated actuator and servo valve. The power consumption of each corner is the product of the fluid flow to the actuator times the supply pressure. Road noise occurs at high frequencies. Large strut velocities are often required to prevent large inputs from effecting commensurate motion of the vehicle chassis. Such large velocities requires a large amount of energy. Since the hydraulic pump is driven by the vehicle engine, a large amount of energy consumed by the active suspension system means that a large amount of energy is being drained from the vehicle engine.

It is therefore desirable to develop a suspension system that provides better ride and handling control than a passive system but does not consume the energy required by a fully active suspension system.

SUMMARY OF THE INVENTION

Inputs to a vehicle suspension system can be characterized as load aiding and load opposing. Inputs are load aiding if the differential pressure in the actuator is consistent with the drive signal or velocity demand so that, if an orifice connected the two fluid chambers of the actuator together, the desired actuator motion would occur, i.e., actuator motion would occur passively. For example, if an external force on the actuator is acting in compression, and the drive signal is "telling" the actuator to compress, the actuator is said to be in a load aiding situation.

Inertia loading is always load opposing and road inputs have both load aiding and load opposing modes. Therefore, there are significant portions of the suspension system's duty cycle where a passive system would suffice. Furthermore, there are road input modes that are load aiding and in which a fully active suspension system operates very inefficiently.

The present invention provides an improved suspension system that is semi-active. The suspension system, in accordance with the present invention, provides active control of the suspension, i.e., connection with the pump, for low frequency input control and passive control, i.e., no connection with the pump, for high frequency input control. This arrangement provides energy saving in the operation of the suspension system.

The present invention further provides an energy saving servo valve arrangement for a semi-active suspension system. An accumulator is operatively connected to one fluid chamber of the actuator. A quiescent pilot fluid flow through the servo valve is drained to the accumulator. This arrangement keeps the accumulator at approximately one-half of the system pressure provided by the pump. The pressurized fluid in the accumulator is used for operation of the actuator as long as the fluid pressure in the accumulator is sufficient to accomplished a determined velocity demand of the accumulator. If the fluid pressure in the accumulator is insufficient, pressurized fluid is provided from a system pump. By draining the quiescent pilot fluid flow from the servo valve to the accumulator, an energy savings is realized in that the energy in the pilot fluid flow is stored in the accumulator instead of being returned to a reservoir as in prior art arrangements.

In accordance with the present invention, a suspension system for a vehicle comprises at least one adjustable wheel corner, each adjustable corner including a linear actuator operatively connected between a sprung mass and an unsprung mass of the vehicle. The linear actuator is actively movable in at least one direction in response to applied fluid pressure. The system further includes a first electrically controlled servo valve having a quiescent pilot fluid flow. An accumulator is connected to its associated actuator through a second electrically controlled servo valve also having a quiescent pilot fluid flow. A pump is operatively connected to the servo valves for providing pilot pressure, the pump being connectable to the actuator upon operation of the first servo valve. Sensing means is provided for sensing force inputs to the vehicle. Control means is connected to the first and second servo valves, and to the sensing means for controlling the first and second servo valves in response to sensed force inputs so as to apply fluid pressure to the actuator from at least one of the pump or from the accumulator and thereby alter an effect of the force input to the vehicle.

In accordance with a preferred embodiment, the quiescent pilot flow from the first and second servo valves are arranged to maintain the accumulator pressure at approximately one-half system pressure.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
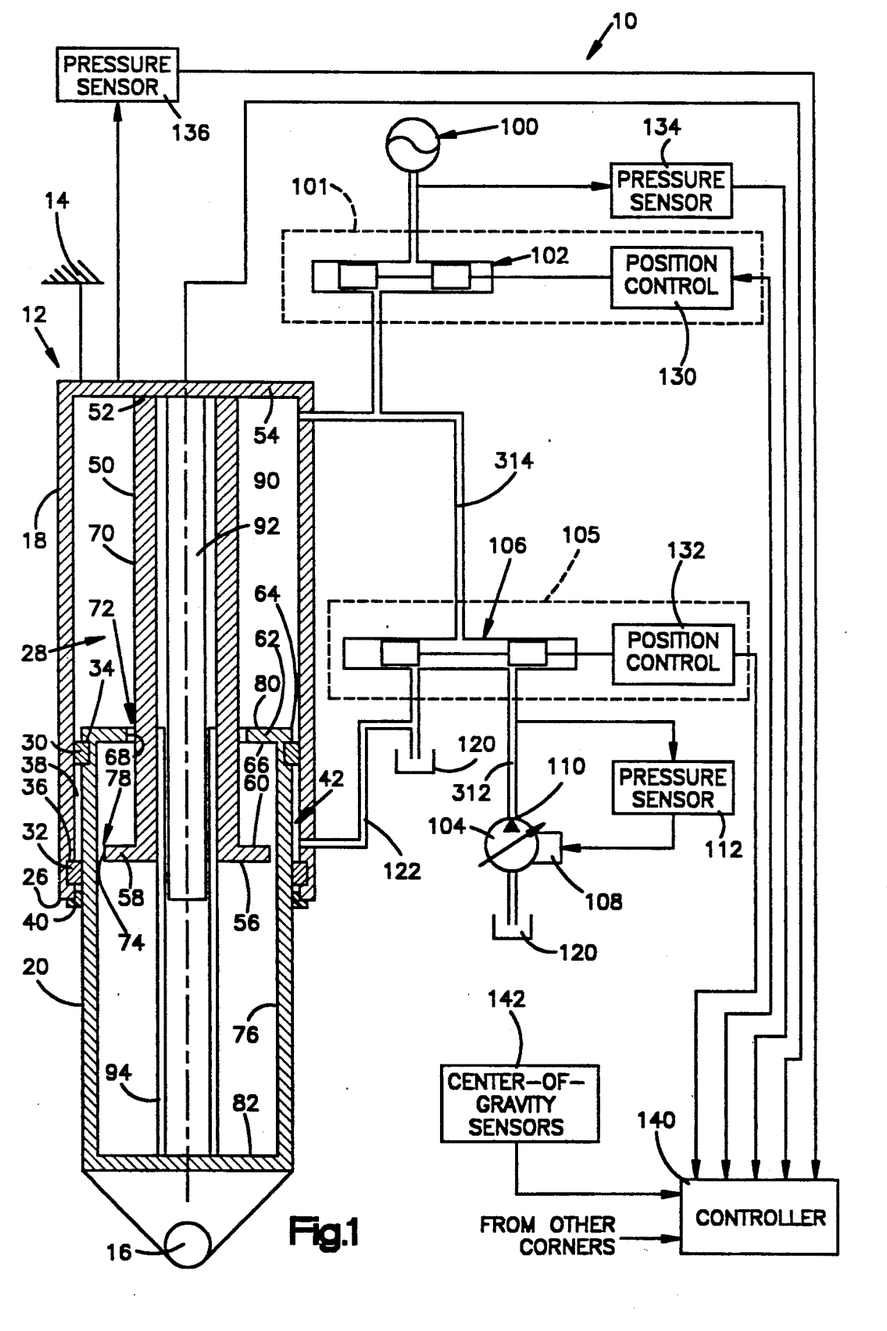
FIG. 1 is a schematic of an vehicle suspension system made in accordance with the present invention.

Referring to FIG. 1, a suspension system 10 for a vehicle includes four corners corresponding to the four wheel corners of the vehicle. Through out this specification, the structure and operation of only one corner is described, it being understood that the structure and operation of the other three corners is similar. In the corner shown, a single acting, linear actuator 12 operative connects the sprung mass 14, i.e, the vehicle chassis, to the unsprung mass 16, i.e., the wheel hub and tire.

Figure 2:
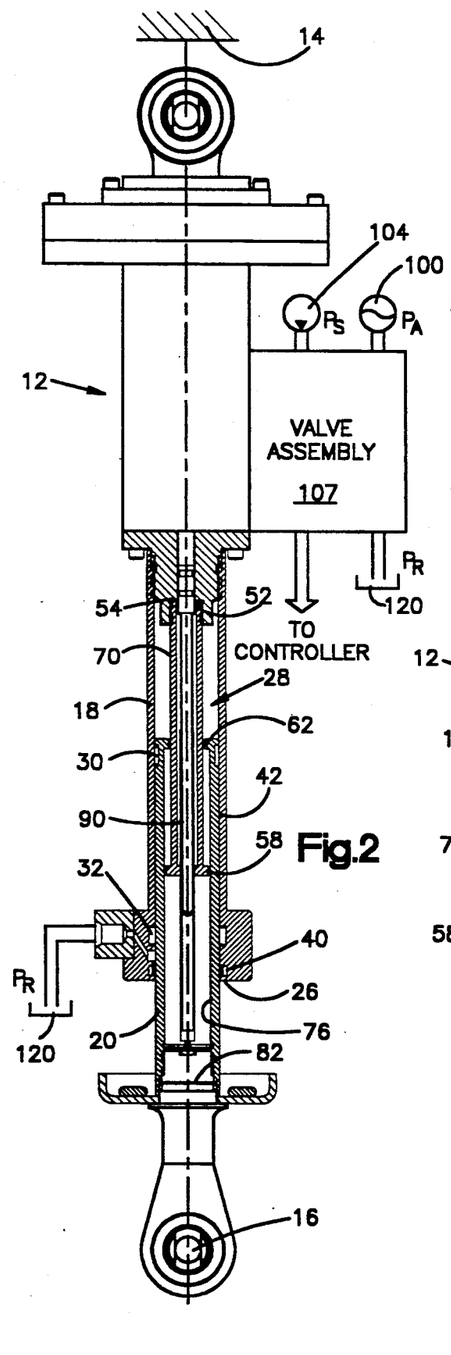
FIG. 2 is a sectional side view of a preferred actuator arrangement made in accordance with the present invention.
Figure 3:
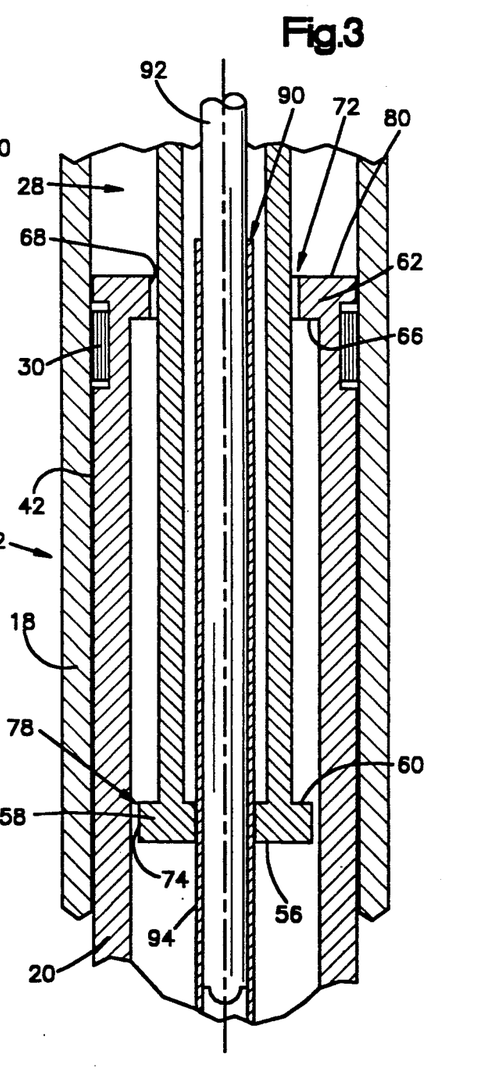
FIG. 3 is an enlarged side view of a portion of the actuator shown in FIG. 2.

Referring to FIGS. 1–3, the actuator 12 includes a first member 18 in the form of a cylindrical housing. The cylindrical housing 18 is connected to the chassis 14. A second member 20 is telescopically received in the cylindrical housing 18. The second member 20 extends through one end 26 of the cylindrical housing 18 and is connected to the wheel hub 16. The second member 20 and the cylindrical housing 18 form a variable volume fluid chamber 28.

The second member 20 is supported in the cylindrical housing 18 by spaced apart bearings 30, 32. Specifically, bearing 30 is received in a recessed opening 34 of the second member 20. Bearing 32 is received in a recessed opening 36 on an inside wall surface 38 of the cylindrical housing 18. A low pressure fluid seal 40 is located near the end 26 of the cylindrical housing 18.

The diameter of the outer surface of the second member 20 is less than the inner diameter of the inner wall surface 38 of the cylindrical housing 18. The bearings 30, 32 keep the second member 20 uniformly spaced from the inner wall surface 38 of the cylindrical housing 18 so as to form a cylindrical manifold chamber 42. The seal 40 is operative between the outer wall surface of member 20 and the inner wall surface 38 of the cylindrical housing 18.

The first member 18 further includes a central cylindrical member 50 secured at its end 52 to the upper wall surface 54 of the cylindrical housing 18. The second end 56 includes an outwardly directed flange portion 58 having a first stop surface 60. The second member 20 includes an inwardly directed flange portion 62 at its end 64. The flange 62 includes a second stop surface 66. The flanges 58, 62 define the maximum extension of the second member 20 relative to the first member 18 as occurs when the stop surfaces 60, 66 engage.

An end 68 of the flange 62 has a diameter greater than the diameter of the outer surface 70 of the inner cylindrical member 50 thereby forming a passage 72 therebetween. An end 74 of the flange 58 has a diameter less than the diameter of the inner surface 76 of the second member thereby forming a passage 78 therebetween.

As mentioned, the actuator 12 is single acting. Fluid pressure in the chamber 28 acts on surfaces 80, 82 of the second member 20. The pressurized fluid in the upper portion of the chamber 28 acts on the surface 82 through passages 72, 78. If the fluid pressure in chamber 28 times the surface area of the second member 20 acted upon by such fluid pressure in chamber 28 is greater than the load at the corner associated with such actuator, the second member 20 moves relative to the first member downward as viewed in FIG. 1. If the fluid pressure in chamber 28 times the surface area of the second member 20 acted upon by such fluid pressure in chamber 28 is less than the load at the corner associated with such actuator, the second member 20 moves relative to the first member upward as viewed in FIG. 1.

A displacement sensor 90 is operatively connected between the first member 18 and the second member 20. It will be appreciated that any of several known displacement sensors can be used to provide an electrical signal having a characteristic indicative of the relative spacing between the first member 18 and the second member 20. The distance between the first member 18 and the second member 20 is, in turn, indicative of the relative distance between the chassis 14 and the wheel hub 16. In accordance with a preferred embodiment of the present invention, a linear voltage differential transformer ("LVDT") 90 has an electric coil 92 secured to the cylindrical housing 18. The LVDT sensor further includes a ferromagnetic tube 94 secured to the second member 20. The coil 92 is telescopically received in the tube 94. The electromagnetic field coupling between the coil and the ferromagnetic tube varies as a function of how much of the coil is within the tube. The LVDT sensor provides an electric signal having a value functionally related to the electromagnetic field coupling which is, in turn, indicative of the relative spacing between the first member 18 and the second member 20.

The chamber 28 is in fluid communication with an air over fluid accumulator 100 through a first valve assembly 101 including an electrically controlled valve 102. The chamber 28 is in fluid communication with a source of pressurized fluid 104 through a second valve assembly 105 including an electrically controlled valve 106. The valve assemblies 101 and 105 are preferably located in a single housing 107 and secured to the side of the actuator 12.

The source of pressurized fluid 104 is preferably a variable displacement pump having a load sense input port 108. The output 110 of the pump 104 is fed back to the load sense input 108 via a pressure sensing line 112.

The input of the pump 104 is in fluid communication with a reservoir 120.

It will be appreciated that, rather than a pressure controlled variable displacement pump, an electrically driven pump could be used wherein the pressure sensor 112 would be a circuit that would monitor the fluid pressure of the output 110 and would control the pump so as to maintain a constant predetermined output pressure. Also, a pump with an electrically controlled pressure regulator operatively located between the pump and the valve 106 could be used. The preferred embodiment of the invention includes a fluid pressure source of constant value at the input of the valve 106.

The cylindrical manifold 42 of the actuator 12 is in fluid communication with the reservoir 120 through a conduit 122. The bearings 30, 32 are designed to permit fluid leakage therepass so that pressurized fluid passes from the chamber 28 into the manifold 42 and out to the reservoir 120. The pressure in the fluid manifold 42 will be only slightly greater than the reservoir pressure. Therefore, the seal 40 is preferably a low pressure fluid seal. By having a fluid lubrication between the first member 18 and the second member 20 and by having a low pressure seal 40 therebetween, the actuator 12 has a reduced friction as compared to known actuators of other designs.

A position control device 130 is operatively coupled to the valve 102 so as to control the amount of fluid communication between the accumulator 100 and the chamber 28 of the actuator 12 in response to an electrical control signal. A position control device 132 is operatively coupled to the valve 106 so as to control the amount of fluid communication between the pump 104 and the chamber 28 of the actuator 12 in response to an electrical control signal. A pressure sensor 134 is operatively connected to the accumulator 100 and provides an electrical signal having a value functionally related to the fluid pressure $P_A$ in the accumulator. A pressure sensor 136 is operatively connected to the chamber 28 of the actuator 12 and provides an electrical signal having a value functionally related to the fluid pressure $P_i$ in the actuator 12.

A controller 140, such as a microcomputer, is operatively connected to the pressure sensors 134, 136, the position controllers 130, 132 of the electrically controlled valves 102, 106 respectively, and to the displacement sensor 90 for each of the four vehicle corners. The controller 140 is further connected to a plurality of center-of-gravity- ("CG") sensors 142. These CG sensors 142 are typically located at or near the center of the vehicle and detect low frequency motions of the vehicle. Such CG sensors 142 include yaw sensors, lateral accelerometers, longitudinal accelerometers, etc. The controller 140 monitors data output from all the vehicle sensors to which it is connected and controls pressure in each accumulator 100 of each corner and in the chamber 28 of each corner so as to control the vehicle suspension in response to sensed high frequency road inputs and low frequency inertia inputs.

Figure 4:
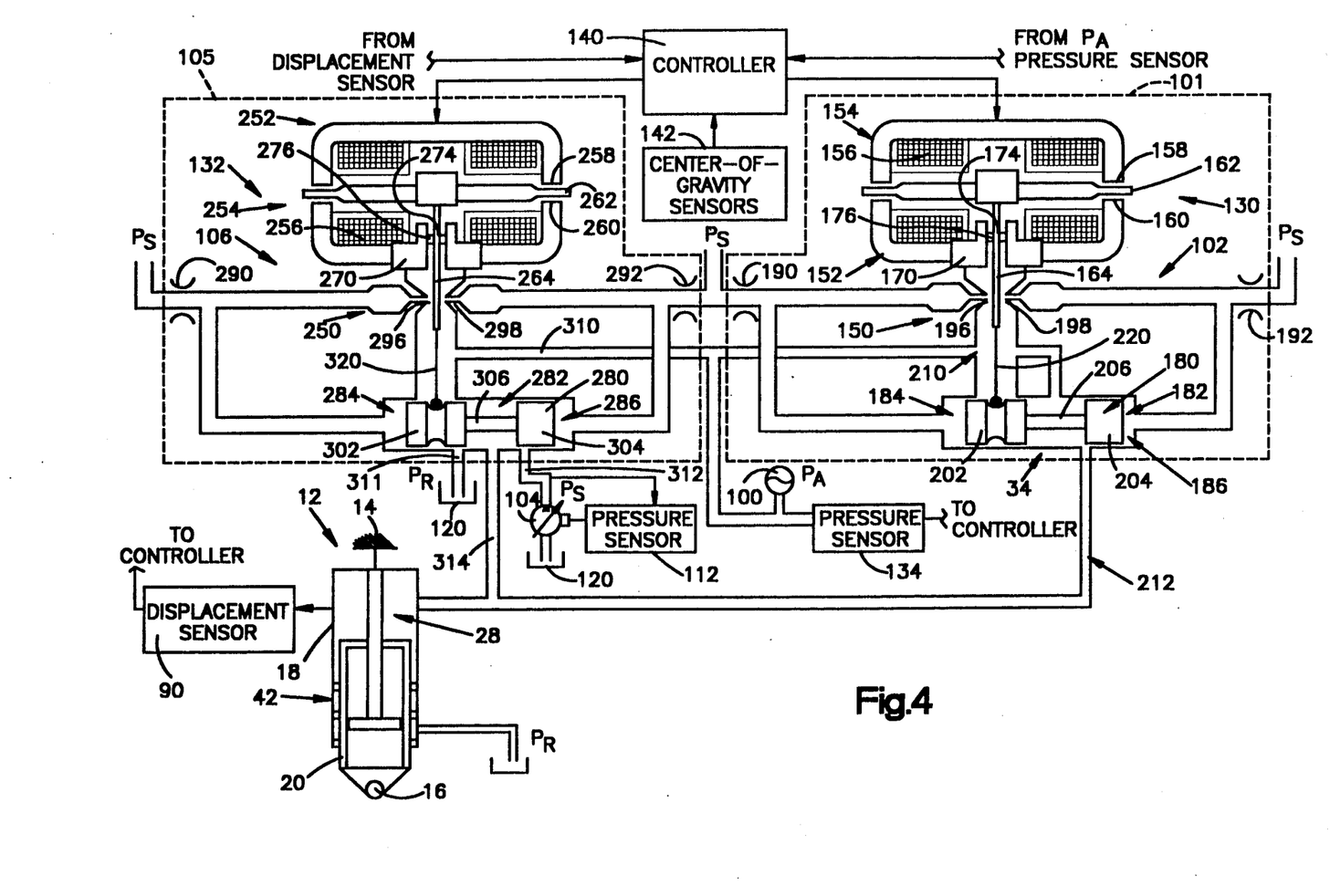
FIG. 4 is a schematic diagram of the servo valves shown in FIG. 1.

Referring to FIG. 4, the valve assembly 101, in accordance with a preferred embodiment of the invention, is an electrically controlled two stage servo valve and includes a second stage spool valve 102 and a first stage flapper valve arrangement 150 that forms part of the position control device 130. The position control device includes an electric torque motor 152 that is operatively connected to the flapper valve 150. The torque motor 152 includes a magnetic assembly 154 including magnetic coils 156, pole pieces 158, 160, and an armature 162. A flapper arm 164 is secured to the armature 162 and extends perpendicular therefrom. The magnetic assembly 154 is secured to a housing 170 of the valve 102.

The flapper 164 has a mounting location 174 about which a flexure tube 176 pivotally secures the flapper 164 to the housing 170 through a press fit. The flexure tube 176 functions to position the armature 162 between the pole pieces 158, 160 and to provide a fluid seal between the magnetic assembly 154 and the flapper valve 150 and the spool valve 102.

The valve 102 includes a spool 180 slidably mounted in a chamber 182. Each side of the spool 180 has an associated pilot chamber 184, 186, respectively. The pilot chamber 184 is in fluid communication with the supply pressure $P_s$ through a fixed orifice 190. The pilot chamber 186 is in fluid communication with the supply pressure $P_s$ through a fixed orifice 192.

The pilot chamber 184 is in fluid communication with an associated pilot orifice 196. The pilot chamber 186 is in fluid communication with an associated pilot orifice 198. The flapper 164 is positioned at a location equal spaced from the pilot orifices 196, 198 when the armature 162 is centrally located between the poles 158, 160. In such a condition, fluid flows through both pilot orifices 196 and 197 equally so as to provide an equal pressure on both sides of the spool 180. The spool 180 under such a condition assumes a centered position as shown in FIG. 4. Flow of fluid through the orifices 196, 198 is referred to as first stage flow.

The spool 180 includes spaced apart land sections 202, 204, spaced by a portion 206. When the spool is in its centered position as shown in FIG. 4 the land 204 permits a relatively small fluid communication between chamber 182 and a passage 212, and passage 210 is in fluid communication with the area of chamber 182 between the lands 202, 204. A feed back wire 220 operatively connects the end of the flapper 164 with the land 202. The passage 212 is in fluid communication with the fluid chamber 28 of the actuator 12. The passage 210 is in fluid communication with the accumulator 100.

The spool 180 when in the centered position as shown in FIG. 4, permits a relatively small amount of fluid communication between the accumulator 100 and the fluid chamber 28 of the actuator 12. When in the flapper 164 is in the centered position, pilot fluid from the pump 104 communicates through orifices 190, 192, through nozzles 196, 198, respectively, through passage 210 to the accumulator 100. This pilot fluid flow is referred to as a quiescent fluid flow of the first stage valve. Also, because of the design of the actuator 12, there is a small leakage path to the reservoir 120 through chamber 182, passage 212, chamber 28, and manifold 42.

When the controller 140 applies an electric current to the coils 156 in one direction, the armature 162 pivots about the mounting location 174 due to the magnetic attraction of the pole pieces 158, 160 on the armature 162. This pivoting of the armature 162 causes the flapper 164 to move toward one of the pilot nozzles 196, 198 depending of the direction of pivot, i.e., the direction of the current through coils 156. Since the valve 102 is only controlling the fluid communication between the accumulator 100 and the chamber 28, the controller pivots the armature in a clockwise direction as view in FIG. 4. As the flapper 164 moves closer toward the nozzle 196, the fluid pressure in chamber 184 increases and the fluid pressure in chamber 186 decreases. This pressure imbalance causes the spool 180 to move to the right, as viewed in FIG. 4, thereby permitting a greater amount of fluid communication between the accumulator 100 and the chamber 28 of the actuator 12. The amount of fluid communication is a function of the pressure imbalance across the spool 180 which is, in turn, a function of the amount of current through the coils 156. The feedback wire 220 tends to pull the flapper 164 away from the nozzle as the spool 180 moves in a manner well known in the art of two stage servo valves.

The valve assembly 105, in accordance with a preferred embodiment of the invention, is an electrically controlled two stage servo valve and includes a second stage spool valve 106 and a first stage flapper valve arrangement 250 that forms part of the position control device 132. The position control device includes an electric torque motor 252 that is operatively connected to the flapper valve 250. The torque motor 252 includes a magnetic assembly 254 including magnetic coils 256, pole pieces 258, 260, and an armature 262. A flapper arm 264 is secured to the armature 262 and extends perpendicular therefrom. The magnetic assembly 254 is secured to a housing 270 of the valve 106.

The flapper 264 has a mounting location 274 about which a flexure tube 276 pivotally secures the flapper 264 to the housing 270 through a press fit. The flexure tube functions to position the armature 262 between the pole pieces 258, 260 and to provide a fluid seal between the magnetic assembly 254 and the flapper valve 250 and spool valve 106.

The valve 106 includes a spool 280 slidably mounted in a chamber 282. Each end of the spool 280 has an associated pilot chamber 284, 286, respectively. The pilot chamber 284 is in fluid communication with the supply pressure $P_s$ through a fixed orifice 290. The pilot chamber 286 is in fluid communication with the supply pressure $P_s$ through a fixed orifice 292.

The pilot chamber 284 is in fluid communication with an associated pilot orifice 296. The pilot chamber 286 is in fluid communication with an associated pilot orifice 298. The flapper 264 is position at a location equal spaced from the pilot orifices 296, 298 when the armature 262 is centrally located between the poles 258, 260. In such a condition, fluid flows through both pilot orifices 296 and 298 equally so as to provide an equal pressure on both sides of the spool 280. The spool 280 under such a condition assumes a centered position as shown in FIG. 4. Flow of fluid through the orifices 296, 298 is referred to as first stage flow.

The spool 280 includes spaced apart land sections 302, 304, spaced by a portion 306. When the spool is in its centered position as shown in FIG. 4, (i) the land 302 blocks fluid communication of chamber 282 from a passage 310 and with a passage 311 connected to the reservoir 120, (ii) land 304 blocks fluid communication of chamber 282 from a passage 312, and (iii) a passage 314 is in communication with the chamber 282 between the lands 302, 304. A feed back wire 320 operatively connects the end of the flapper 264 with the land 302.

The passage 314 is in fluid communication with the fluid chamber 28 of the actuator 12. The passage 310 is in fluid communication with the accumulator 100. The spool 280 when in the centered position as shown in FIG. 4, blocks fluid communication between the pump 104 and the fluid chamber 28 of the actuator 12.

When in the flapper 264 is in the centered position, pilot fluid from the pump 104 communicates through orifices 290, 292, through nozzles 296, 298, through passage 310 to the accumulator 100. This pilot flow is referred to as a quiescent fluid flow of the first stage valve.

When the controller 140 applies an electric current to the coils 256 in one direction, the armature 262 pivots about the mounting location 274 due to the magnetic attraction of the pole pieces 258, 260 on the armature 262. This pivoting of the armature 262 causes the flapper 264 to move toward one of the pilot nozzles 296, 298 depending of the direction of pivot. As the flapper 264 moves closer toward the nozzle 296, the fluid pressure in chamber 284 increases and the fluid pressure in chamber 286 decreases. This pressure imbalance causes the spool 280 to move to the right, as viewed in FIG. 4, thereby permitting fluid communication between the pump 104 and the chamber 28 of the actuator 12. The feedback wire 320 tends to move the flapper 264 away from the nozzle it is closest to in response to movement of the spool 280. The amount of fluid communication is a function of the amount of current to the coils 256.

Control of the position of first member 20 of the actuator 12 through valve assembly 105 provides control for response to low frequency or inertia inputs to the system. For example, when the vehicle rounds a corner, inertia forces transfer loading from the inside of the vehicle to the outside of the vehicle. As weight is transferred, strut displacements change according to the apparent stiffness of the accumulator 100.

Control of the electrically controlled valve assembly 101 for high frequency inputs is depended upon the operating speed of the valve itself. If the valve assembly 101 has a "slow" operating time, i.e., greater that fifty milliseconds, the valve opening is controlled in response to an estimate of the roughness of the road surface and an estimate of the handling inputs. Handling inputs can be characterized either from the accelerations sensed by the CG sensors 142 or directly from steering input sensors while road roughness is derived from variation in the pressure $P_i$ in the actuators 12.

If the operating speed of the valve assembly 101 is less than 10 milliseconds, control of the valve is accomplished in response to sensed specific road inputs.

Figure 5:
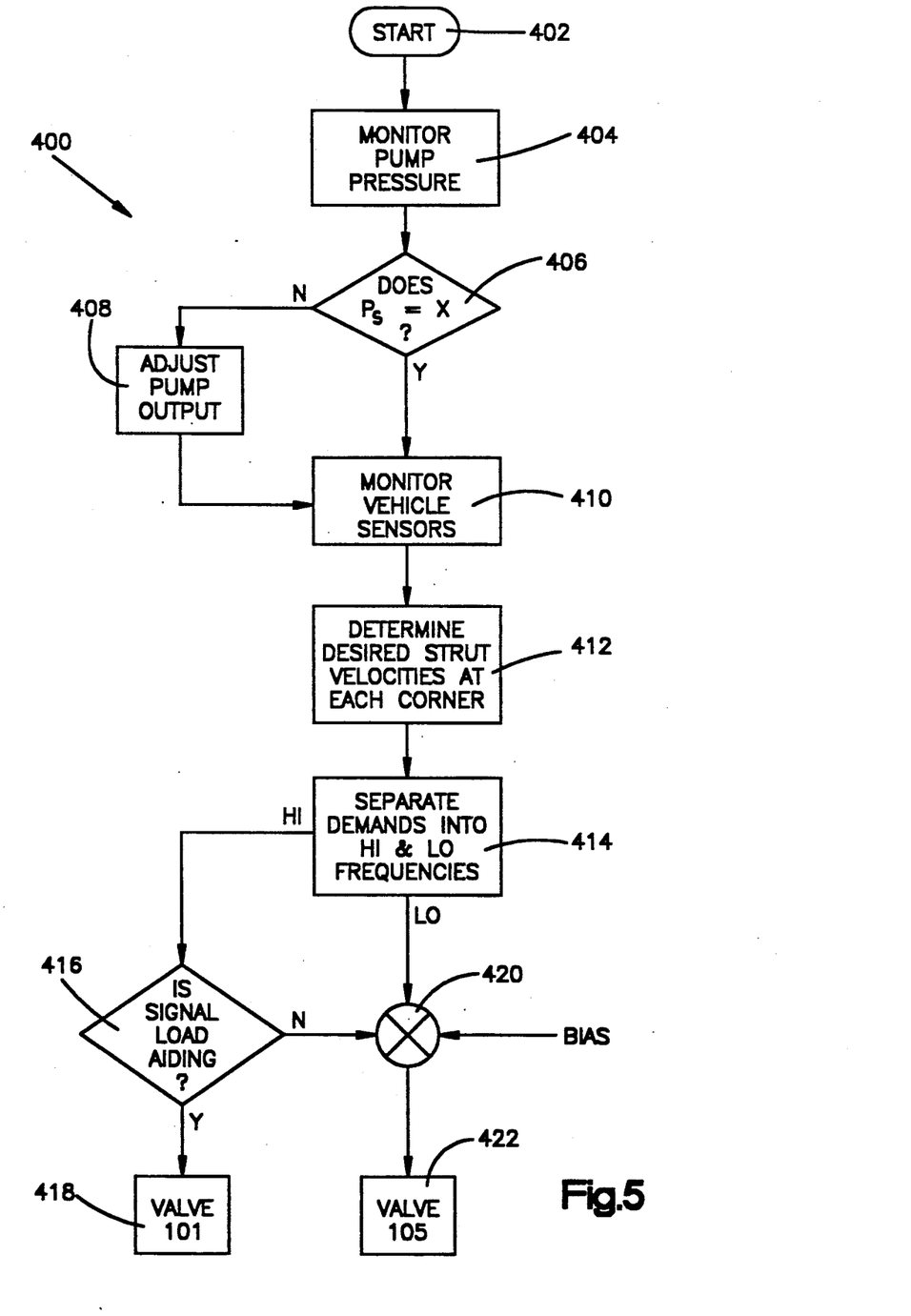
FIG. 5 is a flow diagram of a control process for the vehicle suspension system shown in FIG. 1.

Referring to FIG. 5, a control process 400 followed by the controller 140, in accordance with a preferred embodiment of the present invention, is depicted. In step 402, the controller is initialized upon power up of the vehicle. In step 404, the pressure $P_s$ of the pump is monitored. In step 406, the controller makes a determination as to whether $P_s$ is equal to a predetermined value X. If the determination is negative, the process proceeds to step 408 where the pressure output of the pump is regulated so as to make the $P_s$ equal to X.

The determination in step 406 and the adjustment of the pump output pressure in step 408 assumes that the output of the pump 104 is connected to an electrically controlled pressure regulator or that the pump output pressure is electrically controllable in one of several known ways. It is also possible to have a load sense variable displacement pump arrangement. In such an arrangement, the pump may be a swash plate pump with a load sense feedback line. The angle of the swash plate and, in turn, the pump output pressure is controlled in response to the sensed output pressure of the pump through the load sense feedback line. If a swash plate pump with load sense feedback is used, steps 406, 408 can be eliminated from the process followed by the controller 140.

The process then proceeds from step 408 to step 410. If the determination in step 406 is affirmative, the process proceeds to step 410. In step 410, the controller monitors the CG sensors and the pressures sensed by sensors 134, 136. In step 412, the desired strut velocity is determined in accordance with a desired predetermined handling characteristic of the vehicle and a predetermined ride feel for the vehicle.

In step 414, the controller separates the velocity demands into both high and low frequency demands. Specifically, the controller mathematically hi-pass filters the monitored pressure signal $P_i$. It will be appreciated that an analog hi-pass filter can be used between the sensor 136 and the controller 140. If there is a high frequency road input force present, a determination is made in step 416 as to whether the pressure signal indicates that the motion of the actuator is load aiding.

A motion is load aiding if:

$$(P_A - P_i) \times V_{demand} > 0$$

where $V_{demand}$ is positive for downward movement and negative for upward movement of the second member 20 as viewed in the Figs. If the motion is load aiding, valve 101 is controlled in step 418 in accordance with a predetermined ride feel and handling characteristic.

In step 414, the controller also mathematically low-pass filters the monitored pressure signal $P_i$. It will be appreciated that an analog low-pass filter can be used between the sensor 136 and the controller 140. Such low frequency adjustment includes roll, pitch, passenger loads, luggage, etc.

If the controller determines that the road input force is low frequency in step 414 or if the determination in step 416 is negative, a control signal is developed by the controller 140 by adding a control signal value functionally related to a desired velocity demand to a bias value at step 420. The bias value is a value determined by the controller 140 which is necessary to maintain an average ride height so that, in combination with a predetermined actuator size, the mean value pressure in the accumulator 100 is approximately one-half of the system pressure $P_s$. Both of the first stage flows through the pilot orifices 196, 198, 296, and 298 flow to the accumulator 92. There is a continuous leakage through the open center valve 102, through the passage 212, into the chamber 28, through the manifold 42 and to the reservoir 120. The orifice are designed so as to maintain the pressure $P_A$ in the accumulator 100 at approximately one-half the system pressure $P_s$. If the leakage path is insufficient for this purpose, i.e., the pressure $P_A$ is greater than one-half $P_s$, the bias signal provided by the controller 140 positions the valve 106 more to the left, as viewed in FIG. 4, so as to provide a larger leakage path to reservoir. The control signal from step 420 controls the valve 105 in step 422.

In accordance with another embodiment of the present invention, the road roughness is determined through Fourier analysis or an "averaged" high-pass filter of the signal $P_i$ from each of the pressure sensors for the actuators 12 for each of the corners of the vehicle. Signals from the CG sensors are monitored for handling characteristics such as signals indicative of the lateral acceleration of the vehicle and longitudinal acceleration of the vehicle. The control signals to the associated valves 101, 105 are provided in response to the road roughness determination and desired handling characteristic.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. A vehicle suspension system comprising:
   an actuator operatively connected between a sprung mass and an unsprung mass of the vehicle, said actuator controlling a relative position between the sprung mass and the unsprung mass in response to fluid pressure applied to said actuator;
   a pump for providing a source of pressurized fluid;
   an accumulator operatively connectable to said actuator through an associated valve; and
   two stage servo valve means for controlling fluid pressure in said actuator and for pressurizing said accumulator, second stage flow of said servo valve means providing a variable communication between said pump and said actuator, first stage fluid flow of said servo valve means providing a substantially constant fluid communication between said pump and said accumulator.

2. The vehicle suspension system of claim 1 further including means for maintaining fluid pressure in said accumulator at a value equal to one-half the fluid pressure provided by said pump.

3. A vehicle suspension system comprising:
   an actuator operatively connected between a sprung mass and an unsprung mass of the vehicle, said actuator controlling a relative position between the sprung mass and the unsprung mass in response to fluid pressure applied to said actuator;
   a pump for providing a source of pressurized fluid;
   an accumulator operatively connectable to said actuator through an associated valve; and
   two stage servo valve means for controlling fluid pressure in said actuator and for pressurizing said accumulator, second stage flow of said servo valve means providing a variable communication between said accumulator and said actuator, first stage fluid flow of said servo valve means providing a substantially constant fluid communication between said pump and said accumulator.

4. The vehicle suspension system of claim 3 further including means for maintaining a mean value fluid pressure in said accumulator at a value equal to one-half the fluid pressure provided by said pump.

5. A suspension system for a vehicle comprising:
   at least one adjustable wheel corner, each adjustable corner including a linear actuator operatively connected between a sprung mass and an unsprung mass of the vehicle said linear actuator being actively movable in at least one direction in response to applied fluid pressure;
   a first electrically controlled servo valve having a quiescent pilot fluid flow;
   a second electrically controlled servo valve having a quiescent pilot fluid flow;
   an accumulator connected to its associated actuator through said second electrically controlled servo valve and connected to said quiescent pilot flow from both said first and second servo valves for pressurizing said accumulator;
   a pump operatively connected to said first and second servo valves for providing pilot pressure, said pump being connectable to the actuator upon operation of the first servo valve;
sensor means for sensing force inputs to the vehicle; and
controller means connected to the first and second servo valves, and to the sensor for controlling said first and second servo valves in response to sensed force inputs so as to apply fluid pressure to the actuator from at least one of the pump and the accumulator and thereby alter an effect of the force input to the vehicle.

6. The suspension system of claim 5 wherein said sensing means is a pressure sensor operative connected to at least one of said linear actuators for providing an electrical signal indicative of the fluid pressure in said at least one linear actuator, said fluid pressure being indicative of a force input.

7. The suspension system of claim 5 further including means for maintaining a mean value fluid pressure in said accumulator equal to one-half the fluid pressure provided by said pump.

8. The suspension system of claim 7 further including means to bias said first servo valve so as to connect said accumulator to reservoir and lower pressure in said accumulator when the accumulator pressure exceeds one-half the fluid pressure provided by said pump.

9. The suspension system of claim 5 wherein said controller means controls said first servo valve means in response to sensed low frequency force inputs to the vehicle.

10. The suspension system of claim 5 wherein said controller means controls said second servo valve means in response to sensed high frequency force inputs to the vehicle.

11. A vehicle suspension comprising:
an actuator connectable between chassis and a wheel;
a pump;
an accumulator;
a sensor means for sensing force inputs to the vehicle;
an electrically controlled two stage servo valve means for connecting, through second stage fluid flow, at least one of said pump and said accumulator to said actuator in response to sensed force inputs and for pressurizing said accumulator with first stage fluid flow.

* * * * *